(12) United States Patent
Muthiah et al.

(10) Patent No.: US 11,544,107 B2
(45) Date of Patent: Jan. 3, 2023

(54) STORAGE SYSTEM AND METHOD FOR MULTIPROTOCOL HANDLING

(71) Applicant: Western Digital Technologies, Inc., San Jose, CA (US)

(72) Inventors: Ramanathan Muthiah, Bangalore (IN); Hitesh Golechchha, Bangalore (IN); Dinesh Kumar Agarwal, Bangalore (IN)

(73) Assignee: Western Digital Technologies, Inc., San Jose, CA (US)

( * ) Notice: Subject to any disclaimer, the term of this patent is extended or adjusted under 35 U.S.C. 154(b) by 336 days.

(21) Appl. No.: 16/852,091

(22) Filed: Apr. 17, 2020

(65) Prior Publication Data

US 2021/0326172 A1    Oct. 21, 2021

(51) Int. Cl.
    *G06F 12/00*    (2006.01)
    *G06F 9/48*     (2006.01)
    *G06F 9/54*     (2006.01)
    *G06F 3/06*     (2006.01)

(52) U.S. Cl.
    CPC ............ *G06F 9/4881* (2013.01); *G06F 3/061* (2013.01); *G06F 3/0653* (2013.01); *G06F 3/0659* (2013.01); *G06F 3/0683* (2013.01); *G06F 9/4818* (2013.01); *G06F 9/542* (2013.01)

(58) Field of Classification Search
    CPC ............ G06F 12/0253; G06F 12/0261; G06F 12/0296
    See application file for complete search history.

(56) References Cited

U.S. PATENT DOCUMENTS

| 5,253,348 A | 10/1993 | Scalise |
| 5,369,748 A | 11/1994 | McFarland et al. |
| 2010/0023712 A1* | 1/2010 | Yamaguchi ............ G06F 3/067 711/158 |

(Continued)

FOREIGN PATENT DOCUMENTS

| JP | 2018-180770 A | 11/2018 |
| JP | 2019-57229 A  | 4/2019  |

OTHER PUBLICATIONS

International Search Report completed May 24, 2021 for International Application No. PCT/US2021/016056.

(Continued)

*Primary Examiner* — Mohamed M Gebril
(74) *Attorney, Agent, or Firm* — Crowell & Moring LLP

(57) ABSTRACT

A storage system and method for multiprotocol handling are provided. In one embodiment, a computing device is provided comprising a plurality of communication channels configured to communicate with a storage system, wherein a first communication channel has a faster data transfer speed than a second communication channel. The computing device also comprises a processor configured to determine a priority level of a command; send the command with an indication of its priority level to the storage system; in response to the command being a high-priority command, use the first communication channel for transferring data for the command; and in response to the command being a low-priority command, use the second communication channel for transferring data for the command. Other embodiments are provided.

20 Claims, 6 Drawing Sheets

(56) References Cited

U.S. PATENT DOCUMENTS

| | | | |
|---|---|---|---|
| 2010/0100667 A1* | 4/2010 | Kang | G06F 12/0246 |
| | | | 711/103 |
| 2010/0174856 A1* | 7/2010 | Diggs | G06F 3/0659 |
| | | | 710/305 |
| 2012/0117311 A1* | 5/2012 | Hong | G06F 12/0246 |
| | | | 711/E12.008 |
| 2014/0208004 A1* | 7/2014 | Cohen | G06F 12/0246 |
| | | | 711/103 |
| 2014/0223089 A1* | 8/2014 | Kang | G06F 12/0246 |
| | | | 711/103 |
| 2015/0089164 A1* | 3/2015 | Ware | G11C 7/10 |
| | | | 711/149 |
| 2020/0296069 A1* | 9/2020 | Kitamura | H04L 1/22 |
| 2020/0304426 A1* | 9/2020 | Zhao | H04L 12/66 |
| 2021/0042060 A1* | 2/2021 | Kim | G06F 3/061 |

OTHER PUBLICATIONS

Written Opinion completed May 24, 2021 for International Application No. PCT/US2021/016056.
Israel Patent Office Search Strategy completed May 24, 2021 for International Application No. PCT/US2021/016056.

\* cited by examiner

STORAGE SYSTEM AND METHOD FOR MULTIPROTOCOL HANDLING

BACKGROUND

A host can send read and write requests to a storage system to read data from and store data in a memory of the storage system. The host and storage system can communicate using a communication protocol, and various communication protocols are currently available.

DETAILED DESCRIPTION

Overview

Figure 1A:
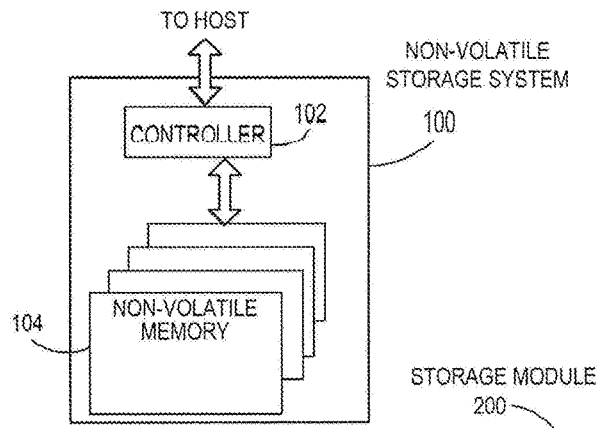
FIG. 1A is a block diagram of a non-volatile storage system of an embodiment.

By way of introduction, the below embodiments relate to a storage system and method for multiprotocol handling. In one embodiment, a computing device is provided comprising a plurality of communication channels configured to communicate with a storage system, wherein a first communication channel has a faster data transfer speed than a second communication channel. The computing device also comprises a processor configured to determine a priority level of a command; send the command with an indication of its priority level to the storage system; in response to the command being a high-priority command, use the first communication channel for transferring data for the command; and in response to the command being a low-priority command, use the second communication channel for transferring data for the command.

In some embodiments, the first communication channel operates under a Peripheral Component Interconnect Express (PCIe) protocol, and wherein the second communication channel operates under a Secure Digital protocol.

In some embodiments, a command for transferring user data is determined to be a high-priority command.

In some embodiments, a command for transferring a log file or debug data is determined to be a low-priority command.

In some embodiments, a command for transferring sequential data is determined to be a high-priority command, and wherein a command for transferring random data is determined to be a low-priority command.

In some embodiments, the priority level is determined based on an identification of an application that issued the command.

In some embodiments, the priority level is determined based on a logical region associated with the command.

In some embodiments, the priority level is determined based an identification of an application that generated the command.

In some embodiments, the processor is configured to shut down one of the first and second communication channels and use the other of the first and second communication channels exclusively for data transfer.

In another embodiment, a method is provided that is performed in a storage system in communication with a host via a first lane and a second lane, the first lane having a faster data transfer speed than the second lane, wherein the storage system comprises a memory. The method comprises storing a plurality of commands received from the host in a queue, wherein each command is flagged either with a first flag instructing data transfer via the first lane or a second flag instructing data transfer via the second lane; transferring data for commands flagged with the first flag using the first lane; and transferring data for commands flagged with the second flag using the second lane.

In some embodiments, the method further comprises prioritizing storage system resources for commands flagged with the first flag.

In some embodiments, the first lane operates under a Peripheral Component Interconnect Express (PCIe) protocol, and wherein the second lane operates under a Secure Digital protocol.

In some embodiments, data transferred for commands flagged with the first flag comprise user data, and wherein data transferred for commands flagged with the second flag comprise a log file or debug data.

In some embodiments, data transferred for commands flagged with the first flag comprise sequential data, and wherein data transferred for commands flagged with the second flag comprise random data.

In some embodiments, the memory comprises a three-dimensional memory.

In another embodiment, a computing device is provided comprising a plurality of lanes configured to communicate with a storage system, wherein a first lane has a faster data transfer speed than a second lane; means for using the first lane for transferring data between the computing device and the storage system that is relatively more time-sensitive; and means for using the second lane for transferring data between the computing device and the storage system that is relatively less time-sensitive.

In some embodiments, the first lane comprises a Peripheral Component Interconnect Express (PCIe) lane, and wherein the second lane comprises a Secure Digital lane.

In some embodiments, the computing device further comprises means for determining whether data is relatively more time-sensitive or relatively less time-sensitive.

In some embodiments, user data is relatively more time-sensitive, and wherein a log file or debug data is relatively less time-sensitive.

In some embodiments, the computing device further comprises means for flagging a command with a flag indicating time sensitivity.

Other embodiments are possible, and each of the embodiments can be used alone or together in combination. Accordingly, various embodiments will now be described with reference to the attached drawings.

Embodiments

Figure 1B:
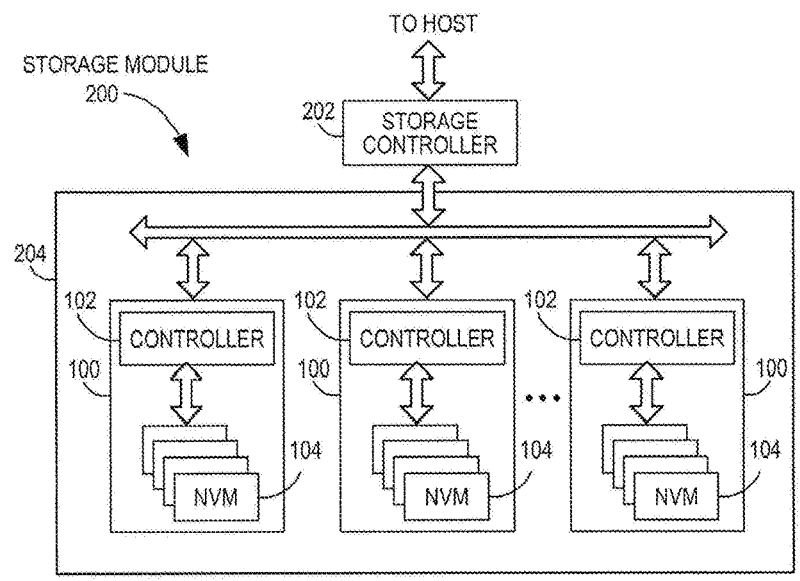
FIG. 1B is a block diagram illustrating a storage module of an embodiment.
Figure 1C:
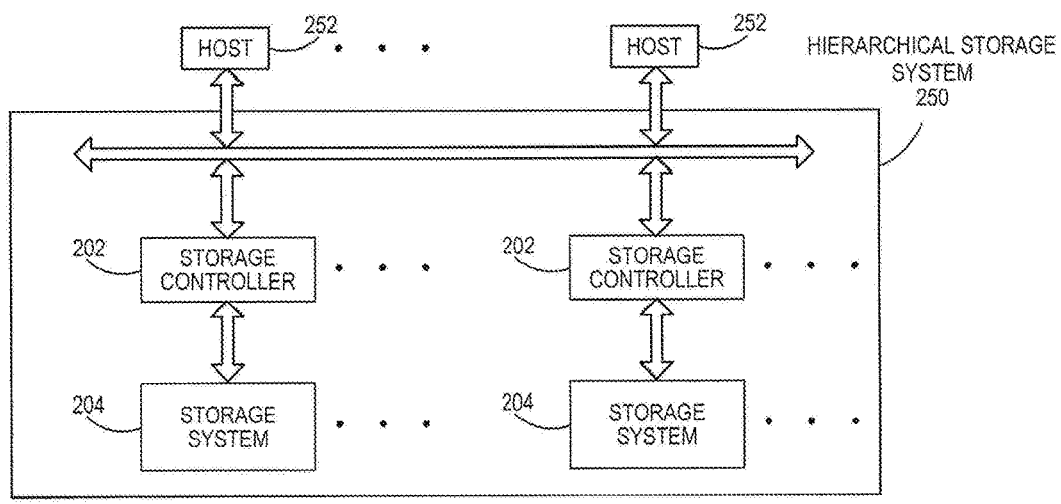
FIG. 1C is a block diagram illustrating a hierarchical storage system of an embodiment.

Storage systems suitable for use in implementing aspects of these embodiments are shown in FIGS. 1A-1C. FIG. 1A is a block diagram illustrating a non-volatile storage system 100 according to an embodiment of the subject matter described herein. Referring to FIG. 1A, non-volatile storage system 100 includes a controller 102 and non-volatile memory that may be made up of one or more non-volatile memory die 104. As used herein, the term die refers to the collection of non-volatile memory cells, and associated circuitry for managing the physical operation of those non-volatile memory cells, that are formed on a single semiconductor substrate. Controller 102 interfaces with a host system and transmits command sequences for read, program, and erase operations to non-volatile memory die 104.

The controller 102 (which may be a non-volatile memory controller (e.g., a flash, resistive random-access memory (ReRAM), phase-change memory (PCM), or magnetoresistive random-access memory (MRAM) controller)) can take the form of processing circuitry, a microprocessor or processor, and a computer-readable medium that stores computer-readable program code (e.g., firmware) executable by the (micro)processor, logic gates, switches, an application specific integrated circuit (ASIC), a programmable logic controller, and an embedded microcontroller, for example. The controller 102 can be configured with hardware and/or firmware to perform the various functions described below and shown in the flow diagrams. Also, some of the components shown as being internal to the controller can also be stored external to the controller, and other components can be used. Additionally, the phrase "operatively in communication with" could mean directly in communication with or indirectly (wired or wireless) in communication with through one or more components, which may or may not be shown or described herein.

As used herein, a non-volatile memory controller is a device that manages data stored on non-volatile memory and communicates with a host, such as a computer or electronic device. A non-volatile memory controller can have various functionality in addition to the specific functionality described herein. For example, the non-volatile memory controller can format the non-volatile memory to ensure the memory is operating properly, map out bad non-volatile memory cells, and allocate spare cells to be substituted for future failed cells. Some part of the spare cells can be used to hold firmware to operate the non-volatile memory controller and implement other features. In operation, when a host needs to read data from or write data to the non-volatile memory, it can communicate with the non-volatile memory controller. If the host provides a logical address to which data is to be read/written, the non-volatile memory controller can convert the logical address received from the host to a physical address in the non-volatile memory. (Alternatively, the host can provide the physical address.) The non-volatile memory controller can also perform various memory management functions, such as, but not limited to, wear leveling (distributing writes to avoid wearing out specific blocks of memory that would otherwise be repeatedly written to) and garbage collection (after a block is full, moving only the valid pages of data to a new block, so the full block can be erased and reused).

Non-volatile memory die 104 may include any suitable non-volatile storage medium, including resistive random-access memory (ReRAM), magnetoresistive random-access memory (MRAM), phase-change memory (PCM), NAND flash memory cells and/or NOR flash memory cells. The memory cells can take the form of solid-state (e.g., flash) memory cells and can be one-time programmable, few-time programmable, or many-time programmable. The memory cells can also be single-level cells (SLC), multiple-level cells (MLC), triple-level cells (TLC), or use other memory cell level technologies, now known or later developed. Also, the memory cells can be fabricated in a two-dimensional or three-dimensional fashion.

The interface between controller 102 and non-volatile memory die 104 may be any suitable flash interface, such as Toggle Mode 200, 400, or 800. In one embodiment, storage system 100 may be a card based system, such as a secure digital (SD) or a micro secure digital (micro-SD) card. In an alternate embodiment, storage system 100 may be part of an embedded storage system.

Although, in the example illustrated in FIG. 1A, non-volatile storage system 100 (sometimes referred to herein as a storage module) includes a single channel between controller 102 and non-volatile memory die 104, the subject matter described herein is not limited to having a single memory channel. For example, in some storage system architectures (such as the ones shown in FIGS. 1B and 1C), 2, 4, 8 or more memory channels may exist between the controller and the memory device, depending on controller capabilities. In any of the embodiments described herein, more than a single channel may exist between the controller and the memory die, even if a single channel is shown in the drawings.

FIG. 1B illustrates a storage module 200 that includes plural non-volatile storage systems 100. As such, storage module 200 may include a storage controller 202 that interfaces with a host and with storage system 204, which includes a plurality of non-volatile storage systems 100. The interface between storage controller 202 and non-volatile storage systems 100 may be a bus interface, such as a serial advanced technology attachment (SATA), peripheral component interconnect express (PCIe) interface, or double-data-rate (DDR) interface. Storage module 200, in one embodiment, may be a solid state drive (SSD), or non-volatile dual in-line memory module (NVDIMM), such as found in server PC or portable computing devices, such as laptop computers, and tablet computers.

FIG. 1C is a block diagram illustrating a hierarchical storage system. A hierarchical storage system 250 includes a plurality of storage controllers 202, each of which controls a respective storage system 204. Host systems 252 may access memories within the storage system via a bus interface. In one embodiment, the bus interface may be a Non-Volatile Memory Express (NVMe) or fiber channel over Ethernet (FCoE) interface. In one embodiment, the system illustrated in FIG. 1C may be a rack mountable mass storage system that is accessible by multiple host computers, such as would be found in a data center or other location where mass storage is needed.

Figure 2A:
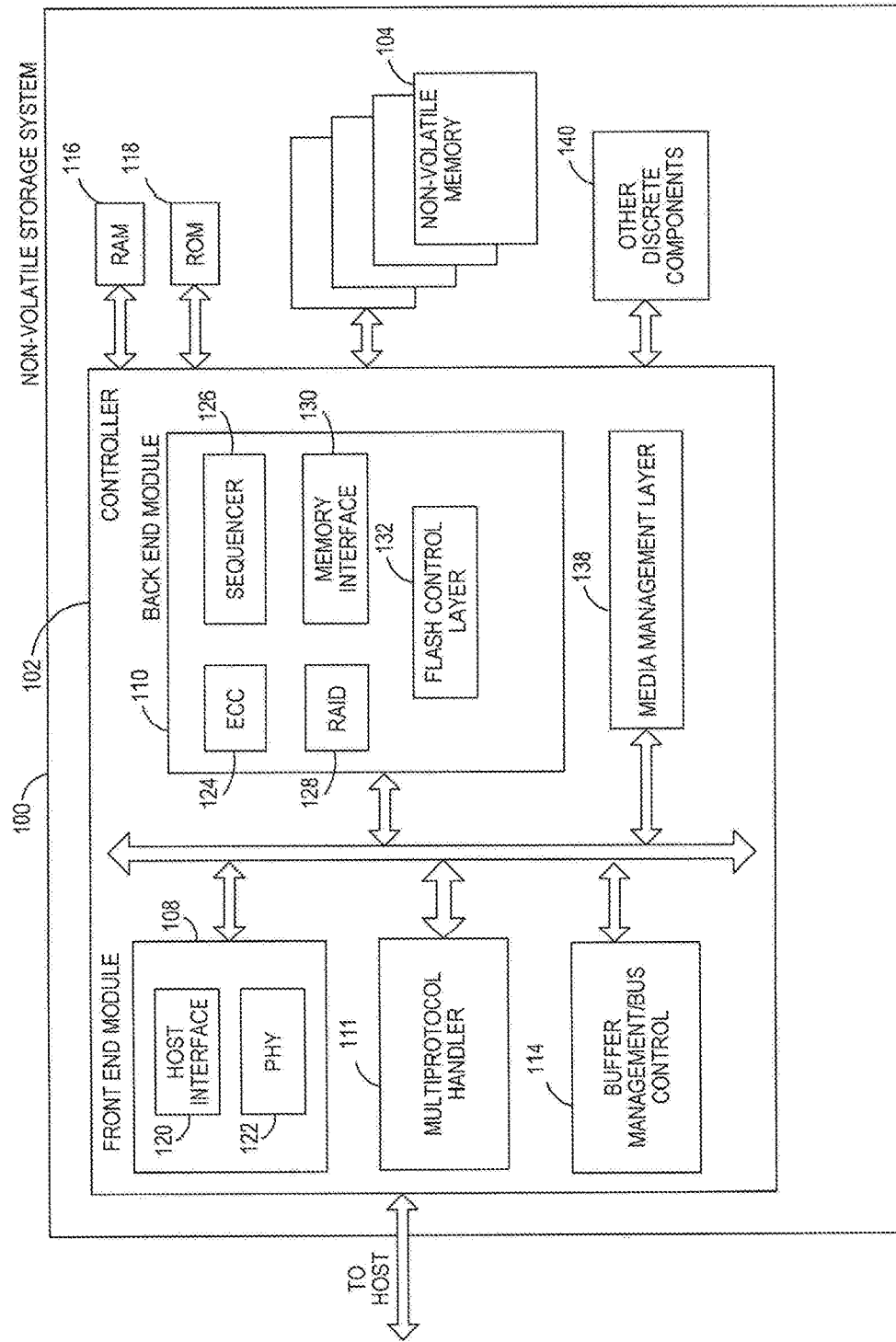
FIG. 2A is a block diagram illustrating components of the controller of the non-volatile storage system illustrated in FIG. 1A according to an embodiment.

FIG. 2A is a block diagram illustrating components of controller 102 in more detail. Controller 102 includes a front end module 108 that interfaces with a host, a back end module 110 that interfaces with the one or more non-volatile memory die 104, and various other modules that perform functions which will now be described in detail. A module may take the form of a packaged functional hardware unit designed for use with other components, a portion of a program code (e.g., software or firmware) executable by a (micro)processor or processing circuitry that usually performs a particular function of related functions, or a self-contained hardware or software component that interfaces with a larger system, for example. Modules of the controller 102 may include a multiprotocol handler 111, which is discussed in more detail below, and can be implemented in hardware or software/firmware to extract various video frames from a video stream. The multiprotocol handler 111 can be configured to perform the algorithms and methods discussed below and shown in the attached drawings.

Referring again to modules of the controller 102, a buffer manager/bus controller 114 manages buffers in random access memory (RAM) 116 and controls the internal bus arbitration of controller 102. A read only memory (ROM) 118 stores system boot code. Although illustrated in FIG. 2A as located separately from the controller 102, in other embodiments one or both of the RAM 116 and ROM 118 may be located within the controller. In yet other embodiments, portions of RAM and ROM may be located both within the controller 102 and outside the controller.

Front end module 108 includes a host interface 120 and a physical layer interface (PHY) 122 that provide the electrical interface with the host or next level storage controller. The choice of the type of host interface 120 can depend on the type of memory being used. Examples of host interfaces 120 include, but are not limited to, SATA, SATA Express, serially attached small computer system interface (SAS), Fibre Channel, universal serial bus (USB), PCIe, and NVMe. The host interface 120 typically facilitates transfer for data, control signals, and timing signals.

Back end module 110 includes an error correction code (ECC) engine 124 that encodes the data bytes received from the host, and decodes and error corrects the data bytes read from the non-volatile memory. A command sequencer 126 generates command sequences, such as program and erase command sequences, to be transmitted to non-volatile memory die 104. A RAID (Redundant Array of Independent Drives) module 128 manages generation of RAID parity and recovery of failed data. The RAID parity may be used as an additional level of integrity protection for the data being written into the memory device 104. In some cases, the RAID module 128 may be a part of the ECC engine 124. A memory interface 130 provides the command sequences to non-volatile memory die 104 and receives status information from non-volatile memory die 104. In one embodiment, memory interface 130 may be a double data rate (DDR) interface, such as a Toggle Mode 200, 400, or 800 interface. A flash control layer 132 controls the overall operation of back end module 110.

The storage system 100 also includes other discrete components 140, such as external electrical interfaces, external RAM, resistors, capacitors, or other components that may interface with controller 102. In alternative embodiments, one or more of the physical layer interface 122, RAID module 128, media management layer 138 and buffer management/bus controller 114 are optional components that are not necessary in the controller 102.

Figure 2B:
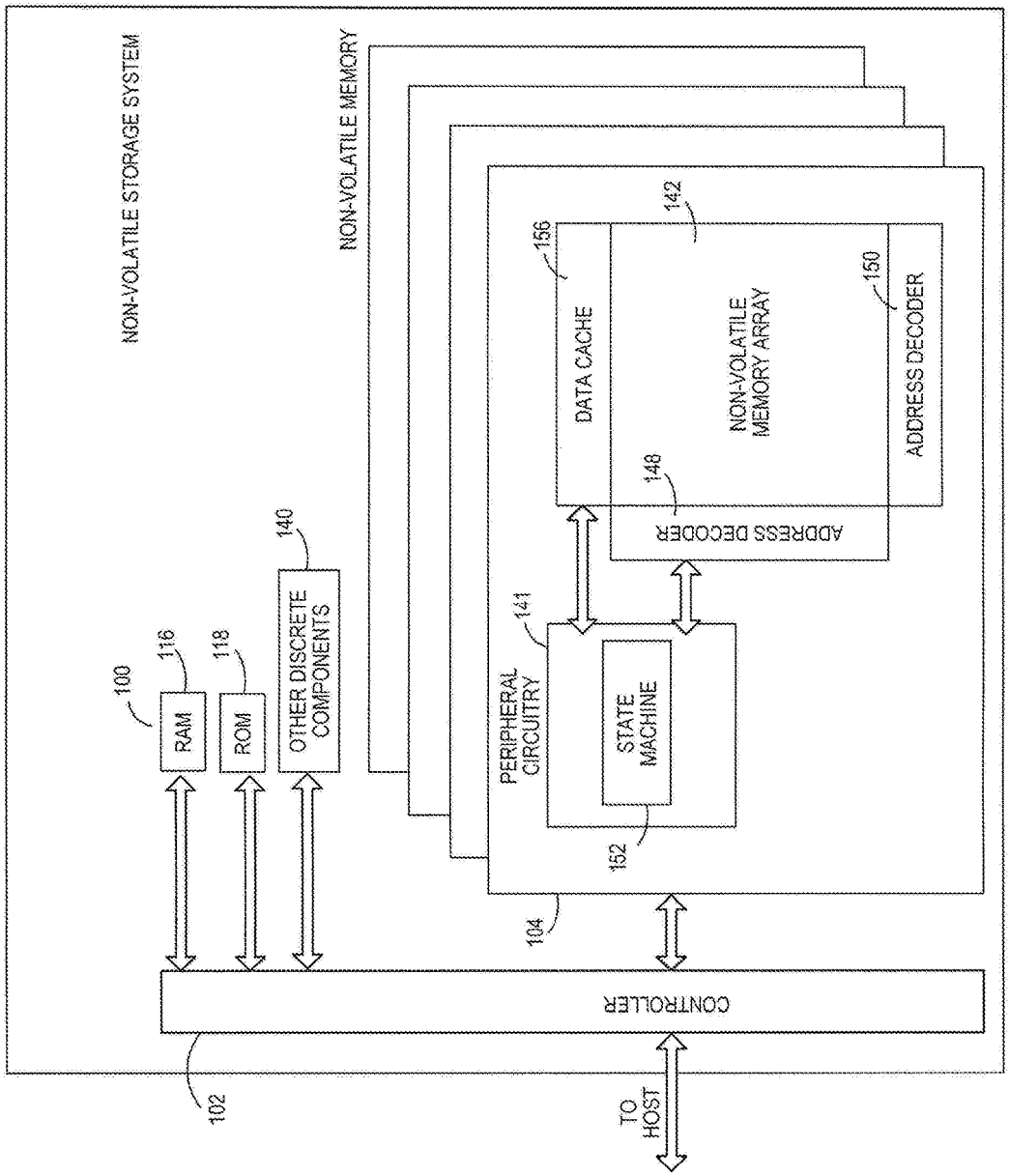
FIG. 2B is a block diagram illustrating components of the non-volatile memory storage system illustrated in FIG. 1A according to an embodiment.

FIG. 2B is a block diagram illustrating components of non-volatile memory die 104 in more detail. Non-volatile memory die 104 includes peripheral circuitry 141 and non-volatile memory array 142. Non-volatile memory array 142 includes the non-volatile memory cells used to store data. The non-volatile memory cells may be any suitable non-volatile memory cells, including ReRAM, MRAM, PCM, NAND flash memory cells and/or NOR flash memory cells in a two dimensional and/or three dimensional configuration. Non-volatile memory die 104 further includes a data cache 156 that caches data. Peripheral circuitry 141 includes a state machine 152 that provides status information to the controller 102.

Returning again to FIG. 2A, the flash control layer 132 (which will be referred to herein as the flash translation layer (FTL) or, more generally, the "media management layer," as the memory may not be flash) handles flash errors and interfaces with the host. In particular, the FTL, which may be an algorithm in firmware, is responsible for the internals of memory management and translates writes from the host into writes to the memory 104. The FTL may be needed because the memory 104 may have limited endurance, may only be written in multiples of pages, and/or may not be written unless it is erased as a block. The FTL understands these potential limitations of the memory 104, which may not be visible to the host. Accordingly, the FTL attempts to translate the writes from host into writes into the memory 104.

The FTL may include a logical-to-physical address (L2P) map and allotted cache memory. In this way, the FTL translates logical block addresses ("LBAs") from the host to physical addresses in the memory 104. The FTL can include other features, such as, but not limited to, power-off recovery (so that the data structures of the FTL can be recovered in the event of a sudden power loss) and wear leveling (so that the wear across memory blocks is even to prevent certain blocks from excessive wear, which would result in a greater chance of failure).

Figure 3:
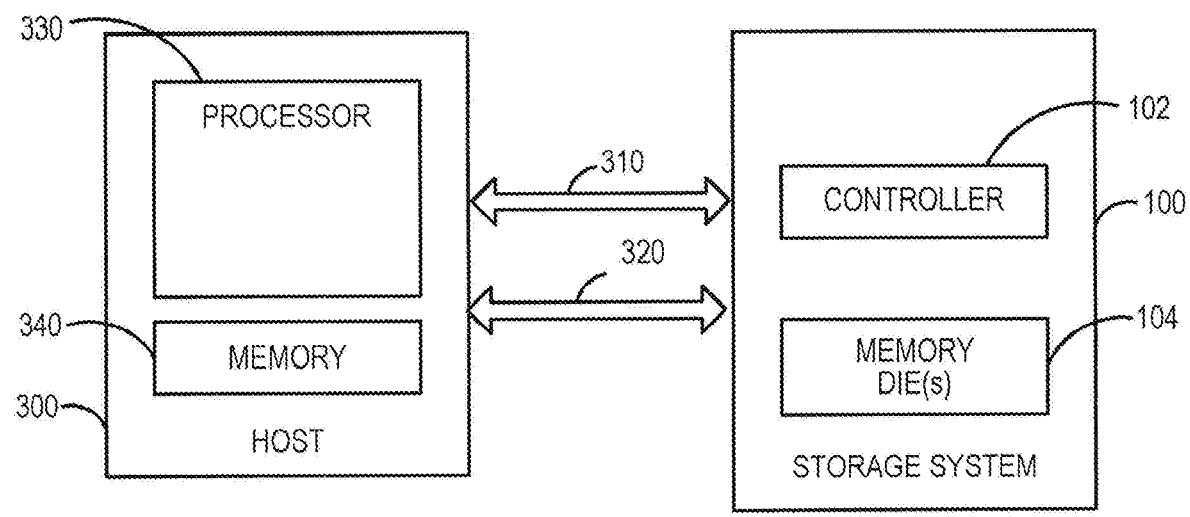
FIG. 3 is a block diagram of a computing device and storage system of an embodiment.

Turning again to the drawings, FIG. 3 is a block diagram of a host 300 and storage system 100 of an embodiment. The host 300 can take any suitable form, including, but not limited to, a computer, a mobile phone, a tablet, a wearable device, a digital video recorder, a surveillance system, etc. The host 300 in this embodiment (here, a computing device) comprises a processor 330 and a memory 340. In one embodiment, computer-readable program code that configures the processor 330 to implement a multiprotocol handler is stored in the memory 340 and is executed by the processor 330. In another embodiment, the multiprotocol handler is implemented exclusively in hardware.

The host 300 and storage system 100 are in communication with each other via a first communication channel 310 and a second communication channel 320. While only two communication channels 310, 320 (sometimes referred to herein as lanes) are shown in FIG. 3, it should be understood that more than two channels can be used. In this embodiment, the two channels 310, 320 have different data transfer speeds and are associated with different protocols. For example, one of the communication channels can operate under a Peripheral Component Interconnect Express (PCIe) protocol, and the other communication channel can operates under a Secure Digital protocol. In that example, the storage system 100 can be considered an SD-PCIe storage system with two independent data lanes, one to support an SD mode of operations and the other to support a PCIe mode of operation. The specification for the SD-PCIe storage system can be continued to subsequent versions of the SD protocol (e.g., SD 7.0 and upwards) involving the SD and the NVMe stacks together. Typically, NVMe systems have a PCIe lane for data transfer, and an SD system can have a SD data transfer lane in addition to the required PCIe lanes to ensure that the storage system (e.g., a SD-Express memory card) is backwards compatible.

The two data communication channels can have different data transfer speeds, one suitable for NVMe speeds and the other suitable for SD speeds. While the storage system 100 can use just one of the channels at any given time, the host 300 and storage system 100 in one embodiment use their multiprotocol handlers to take advantage of both data communication channels to increase performance. For example, this embodiment can use both hardware lanes for better system throughput, wherein both the SD lane and the PCIe lane are utilized together according to the host's use case requirement. The low data rate SD lanes can be utilized by the host 300 to achieve non-time critical data movement, as a result allowing the PCIe lanes to operate in full swing. As an example, the host 300 can use the SD lanes for transferring debug data, log data, or random data with fewer input-output operations per second (TOPS). The host 300 can power both lanes with the appropriate clocks.

Figure 4:
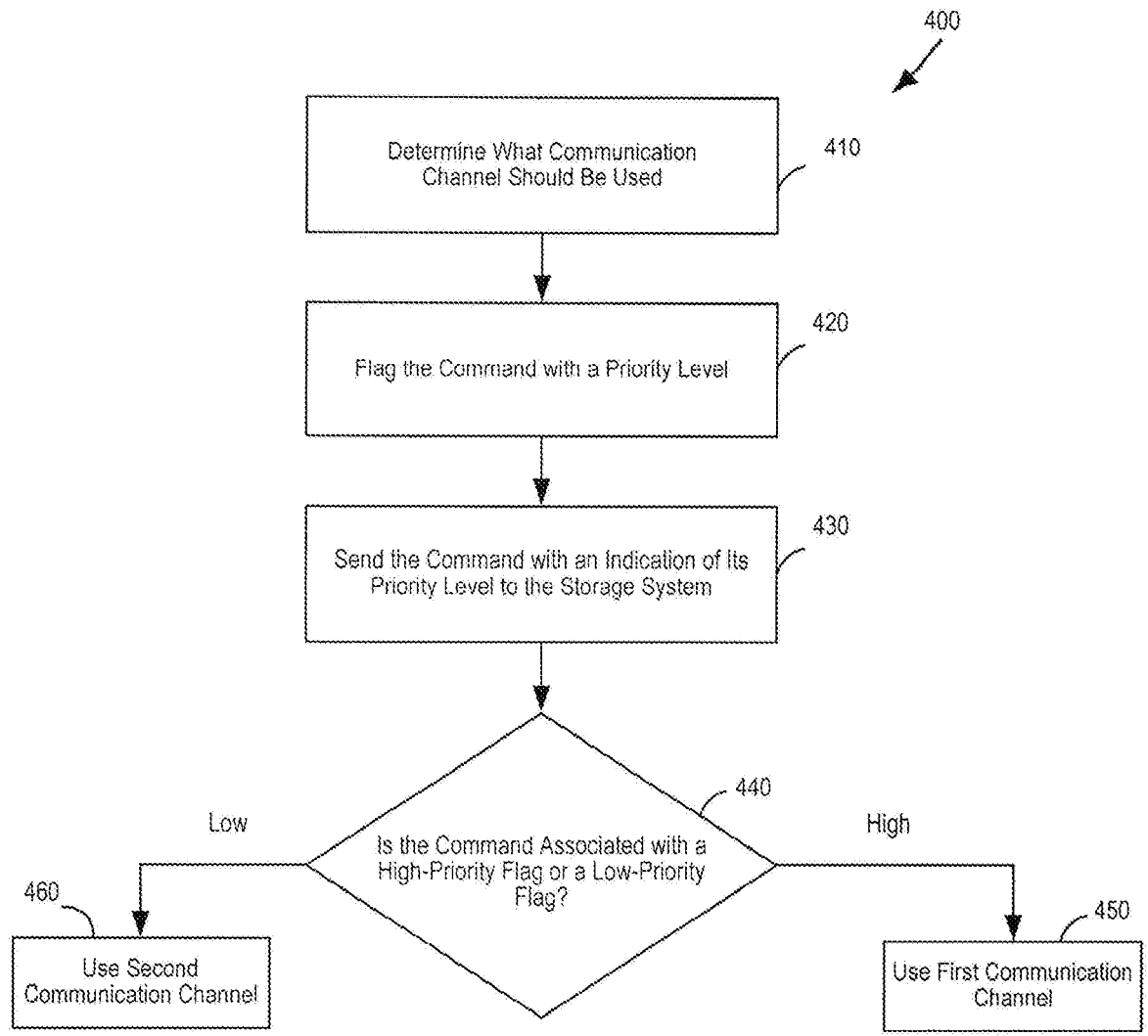
FIG. 4 is a flow chart for multiprotocol handling of an embodiment.

FIG. 4 is a flow chart 400 of a method of an embodiment that can be used to optimize physical lane utilization in an SD-PCIe storage system to leverage the fact that not all commands/data need PCIe performance. It should be understood while SD and PCIe lanes will be used in this example, other protocols and data transfer rates can be used. Also, as noted above, while two lanes will be used in this example, more than two lanes can be used (e.g., each of X number of lanes used for X number of different priority levels).

As shown in FIG. 4, first, the processor 330 in the host 300 determines whether data for a given command should use the first communication channel 310 (e.g., the PCIe lane) or the second communication channel 320 (e.g., the SD lane) (act 410). The processor 330 in the host 300 can determine a priority level for a command and flag or otherwise indicate the priority level of the command (act 420). For example, a command for transferring user data can be considered a high-priority command, whereas a command for transferring a log file, debug data, or other non-time critical data can be considered a low-priority command. So, lane selection can be based on whether data transfer for a command is relatively more or relatively less time-sensitive than another command. A threshold level can be used to determine time sensitivity. As another example, a command for transferring sequential data can be considered to be a high-priority command, whereas a command for transferring random data with a relatively low input-output operations per second (IOPS) can be considered a low-priority command. As yet another example, the priority level can be determined based on an identification of an application issuing the command or based on a logical region of memory associated with the command. Of course, these are merely examples, and other ways of classifying a command can be used.

Figure 5:
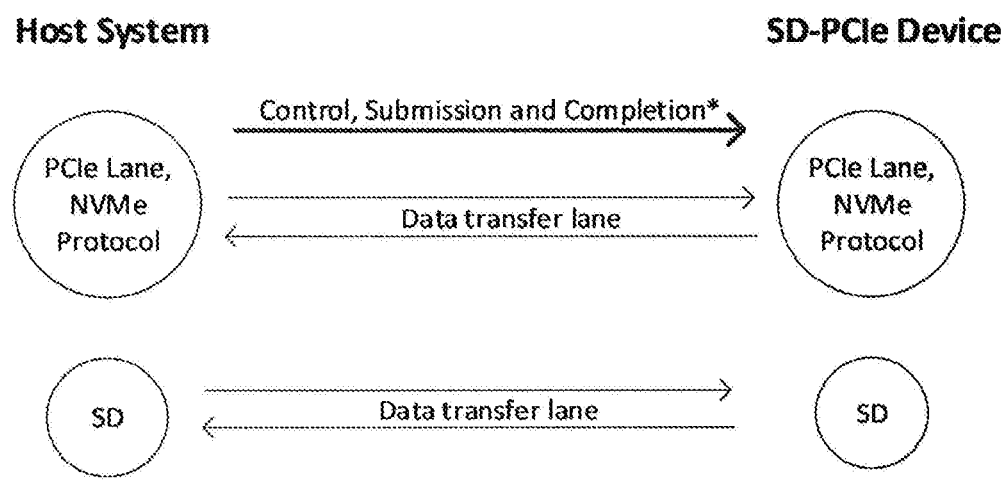
FIG. 5 is an illustration of communication between a computing device and a storage system of an embodiment.

The host 300 then sends the command with an indication of its priority level to the storage system 100 (act 430). As shown in FIG. 5, to be consistent with the PCIe protocol, the host 300 can submit the commands through existing NVMe submission queues in the storage system 100 (here, an SD-PCIe Device) using the control, submission queue, and completion queue channel. The commands can be flagged with the lane in which the host 300 wants the data to be transferred (e.g., Command 1—PCIe Lane Flag; Command 2—PCIe Lane Flag; Command 3—SD Lane Flag; and Command 4—PCIe Lane Flag). In a mixed load (read/write) situation, the host 300 can mark read commands with a PCIe lane flag and write commands with a SD lane flag during submission if it determines that reads are to be executed with priority. In another example, the host 300 can submit commands from various applications and mark a logical region from one application with a PCIe lane flag if the command from the application needs a quick command turnaround and mark commands from another application with an SD lane flag if they can afford more system latency.

For any given command, a determination is made as to what communication channel to use based on the flag associated with the command (act 440). In response to the command being associated with a high-priority command flag, the first communication channel 310 is used for transferring data for the command (act 450). In response to the command being associated with a low-priority command flag, the second communication channel 320 is used for transferring data for the command (act 460).

The host 300 can make these determinations (e.g., by picking the lane to use for data transfer based on the command priority), or the determination can be made by the storage system 100 (e.g., in the NVMe context). Even when the storage system 100 is making the determination, the host 300 can still be said to be using the channel 310, 320 for data transfer, be it for receiving data for a read command or providing data for a write command.

When the storage system 100 makes the determination, the processor 102 in the storage system 100 can prioritize those commands marked with the PCIe lane flag as compared to those marked with the SD lane flag. In addition, the storage system 100 can prioritize its hardware resources and cache for commands marked with the PCIe lane flag. The multiprotocol mode of operation may or may not mean that the host 300 marks different logical region for different lane rates. Two different commands falling in a close logical region can be submitted for different lane rate accesses. Since NVMe is a mature stack and largely covers the requirement of the SD stack, all the commands may be submitted into NVMe queue, but the storage system 100 may transfer data for some of the commands through the SD data lane as per the agreed protocol. The leftover SD commands not covered under NVMe protocol can be sent as vendor-specific commands to the storage system 100.

As can be seen by the above example, this embodiment can use existing hardware lanes for better system throughput, wherein both communication channel (here, the SD and the PCIe lanes) are utilized together according to host use case requirements. The lanes can be clocked with appropriate speeds as would be the case with one protocol requirement, but the individual lanes are used for different commands according the host/end-application requirement. That allows the slower SD lane to be used for non-time-critical data and the PCIe lane to operate in full swing with other data. The host processor 330 (e.g., executing a driver) can sort the use cases and assign flags to each of the submitted commands). If there are multiple applications running on the host 300, the host processor 320 can evaluate the performance requirement for those applications. Also, while the host 300 can power both the lanes and provide them with the appropriate clock signals, the host 300 can also shut down one of the first and second communication channels 310, 320 and use the other of the first and second communication channels 310, 320 exclusively for data transfer. So, clock gating can be performed to shut one lane and fall back to a single-protocol system. Also, if sequential accesses are required at the SD rate, high IOPS can be obtained for random data by using the PCIe lane instead of the SD lane.

Finally, as mentioned above, any suitable type of memory can be used. Semiconductor memory devices include volatile memory devices, such as dynamic random access memory ("DRAM") or static random access memory ("SRAM") devices, non-volatile memory devices, such as resistive random access memory ("ReRAM"), electrically erasable programmable read only memory ("EEPROM"), flash memory (which can also be considered a subset of EEPROM), ferroelectric random access memory ("FRAM"), and magnetoresistive random access memory ("MRAM"), and other semiconductor elements capable of storing information. Each type of memory device may have different configurations. For example, flash memory devices may be configured in a NAND or a NOR configuration.

The memory devices can be formed from passive and/or active elements, in any combinations. By way of non-limiting example, passive semiconductor memory elements include ReRAM device elements, which in some embodiments include a resistivity switching storage element, such as an anti-fuse, phase change material, etc., and optionally a steering element, such as a diode, etc. Further by way of non-limiting example, active semiconductor memory elements include EEPROM and flash memory device elements, which in some embodiments include elements containing a charge storage region, such as a floating gate, conductive nanoparticles, or a charge storage dielectric material.

Multiple memory elements may be configured so that they are connected in series or so that each element is individually accessible. By way of non-limiting example, flash memory devices in a NAND configuration (NAND memory) typically contain memory elements connected in series. A NAND memory array may be configured so that the array is composed of multiple strings of memory in which a string is composed of multiple memory elements sharing a single bit line and accessed as a group. Alternatively, memory elements may be configured so that each element is individually accessible, e.g., a NOR memory array. NAND and NOR memory configurations are examples, and memory elements may be otherwise configured.

The semiconductor memory elements located within and/or over a substrate may be arranged in two or three dimensions, such as a two dimensional memory structure or a three dimensional memory structure.

In a two dimensional memory structure, the semiconductor memory elements are arranged in a single plane or a single memory device level. Typically, in a two dimensional memory structure, memory elements are arranged in a plane (e.g., in an x-z direction plane) which extends substantially parallel to a major surface of a substrate that supports the memory elements. The substrate may be a wafer over or in which the layer of the memory elements are formed or it may be a carrier substrate which is attached to the memory elements after they are formed. As a non-limiting example, the substrate may include a semiconductor such as silicon.

The memory elements may be arranged in the single memory device level in an ordered array, such as in a plurality of rows and/or columns. However, the memory elements may be arrayed in non-regular or non-orthogonal configurations. The memory elements may each have two or more electrodes or contact lines, such as bit lines and wordlines.

A three dimensional memory array is arranged so that memory elements occupy multiple planes or multiple memory device levels, thereby forming a structure in three dimensions (i.e., in the x, y and z directions, where the y direction is substantially perpendicular and the x and z directions are substantially parallel to the major surface of the substrate).

As a non-limiting example, a three dimensional memory structure may be vertically arranged as a stack of multiple two dimensional memory device levels. As another non-limiting example, a three dimensional memory array may be arranged as multiple vertical columns (e.g., columns extending substantially perpendicular to the major surface of the substrate, i.e., in the y direction) with each column having multiple memory elements in each column. The columns may be arranged in a two dimensional configuration, e.g., in an x-z plane, resulting in a three dimensional arrangement of memory elements with elements on multiple vertically stacked memory planes. Other configurations of memory elements in three dimensions can also constitute a three dimensional memory array.

By way of non-limiting example, in a three dimensional NAND memory array, the memory elements may be coupled together to form a NAND string within a single horizontal (e.g., x-z) memory device levels. Alternatively, the memory elements may be coupled together to form a vertical NAND string that traverses across multiple horizontal memory device levels. Other three dimensional configurations can be envisioned wherein some NAND strings contain memory elements in a single memory level while other strings contain memory elements which span through multiple memory levels. Three dimensional memory arrays may also be designed in a NOR configuration and in a ReRAM configuration.

Typically, in a monolithic three dimensional memory array, one or more memory device levels are formed above a single substrate. Optionally, the monolithic three dimensional memory array may also have one or more memory layers at least partially within the single substrate. As a non-limiting example, the substrate may include a semiconductor such as silicon. In a monolithic three dimensional array, the layers constituting each memory device level of the array are typically formed on the layers of the underlying memory device levels of the array. However, layers of adjacent memory device levels of a monolithic three dimensional memory array may be shared or have intervening layers between memory device levels.

Then again, two dimensional arrays may be formed separately and then packaged together to form a non-monolithic memory device having multiple layers of memory. For example, non-monolithic stacked memories can be constructed by forming memory levels on separate substrates and then stacking the memory levels atop each other. The substrates may be thinned or removed from the memory device levels before stacking, but as the memory device levels are initially formed over separate substrates, the resulting memory arrays are not monolithic three dimensional memory arrays. Further, multiple two dimensional memory arrays or three dimensional memory arrays (monolithic or non-monolithic) may be formed on separate chips and then packaged together to form a stacked-chip memory device.

Associated circuitry is typically required for operation of the memory elements and for communication with the memory elements. As non-limiting examples, memory devices may have circuitry used for controlling and driving memory elements to accomplish functions such as programming and reading. This associated circuitry may be on the same substrate as the memory elements and/or on a separate substrate. For example, a controller for memory read-write operations may be located on a separate controller chip and/or on the same substrate as the memory elements.

One of skill in the art will recognize that this invention is not limited to the two dimensional and three dimensional structures described but cover all relevant memory structures within the spirit and scope of the invention as described herein and as understood by one of skill in the art.

It is intended that the foregoing detailed description be understood as an illustration of selected forms that the invention can take and not as a definition of the invention. It is only the following claims, including all equivalents, that are intended to define the scope of the claimed invention. Finally, it should be noted that any aspect of any of the embodiments described herein can be used alone or in combination with one another.

What is claimed is:

1. A computing device comprising:
   first and second communication channels configured to communicate with a storage system, wherein the first communication channel has a faster data transfer speed than the second communication channel; and a processor configured to:
provide clock signals to the first and second communication channels;
determine a priority level of a command;
send the command with an indication of its priority level to the storage system;
in response to the command being a high-priority command, use the first communication channel for transferring data for the command and perform clock gating to remove the clock signal from the second communication channel; and
in response to the command being a low-priority command, use the second communication channel for transferring data for the command and perform clock gating to remove the clock signal from the first communication channel.

2. The computing device of claim 1, wherein the first communication channel operates under a Peripheral Component Interconnect Express (PCIe) protocol.

3. The computing device of claim 1, wherein a command for transferring user data is determined to be a high-priority command.

4. The computing device of claim 1, wherein a command for transferring a log file is determined to be a low-priority command.

5. The computing device of claim 1, wherein:
a command for transferring sequential data is determined to be a high-priority command; and
a command for transferring random data is determined to be a low-priority command.

6. The computing device of claim 1, wherein the priority level is determined based on an identification of an application that issued the command.

7. The computing device of claim 1, Wherein the priority level is determined based on a logical region associated with the command.

8. The computing device of claim 1, wherein the priority level is determined based an identification of an application that generated the command.

9. The computing device of claim 1, wherein the processor is further configured to:
shut down one of the first and second communication channels; and
use the other of the first and second communication channels exclusively for data transfer.

10. A method comprising:
performing the following in a storage system in communication with a host via a first lane and a second lane, the first and second lanes both receiving clock signals and the first lane having a faster data transfer speed than the second lane, wherein the storage system comprises a memory:
storing a plurality of commands received from the host in a queue, wherein each command is flagged either with a first flag instructing data transfer via the first lane or a second flag instructing data transfer via the second lane;
transferring data for commands flagged with the first flag using the first lane and performing clock gating to remove the clock signal from the second lane; and
transferring data for commands flagged with the second flag using the second lane and performing clock gating to remove the clock signal from the first lane.

11. The method of claim 10, further comprising prioritizing storage system resources for commands flagged with the first flag.

12. The method of claim 10, wherein the first lane operates under a Peripheral Component Interconnect Express (PCIe) protocol.

13. The method of claim 10, wherein:
data transferred for commands flagged with the first flag comprise user data; and
data transferred for commands flagged with the second flag comprise a log file.

14. The method of claim 10, wherein:
data transferred for commands flagged with the first flag comprise sequential data; and
data transferred for commands flagged with the second flag comprise random data.

15. The method of claim 10, wherein the memory comprises a three-dimensional memory.

16. A computing device comprising:
a plurality of lanes configured to communicate with a storage system, wherein a first lane has a faster data transfer speed than a second lane;
means for using the first lane for transferring data between the computing device and the storage system that is relatively more time-sensitive, wherein a clock signal is removed from the second lane in response to the first lane being used; and
means for using the second lane for transferring data between the computing device and the storage system that is relatively less time-sensitive, wherein a clock signal is removed from the first lane in response to the second lane being used.

17. The computing device of claim 2, wherein the second communication channel operates under a Secure Digital protocol.

18. The computing device of claim 1, wherein a command for transferring debug data is determined to be a low-priority command.

19. The method of claim 12, wherein the second lane operates under a Secure Digital protocol.

20. The method of claim 10, wherein:
data transferred for commands flagged with the first flag comprise user data; and
data transferred for commands flagged with the second flag comprise debug data.

* * * * *